March 15, 1949. R. C. DUNCAN ET AL 2,464,220
FILM RECORD SELECTING AND PROJECTING DEVICE
Filed April 28, 1945 7 Sheets-Sheet 4

Inventors
R. C. Duncan
R. M. Hicks

By Ralph L. Chappell
Attorney

March 15, 1949.  R. C. DUNCAN ET AL  2,464,220
FILM RECORD SELECTING AND PROJECTING DEVICE
Filed April 28, 1945  7 Sheets-Sheet 5
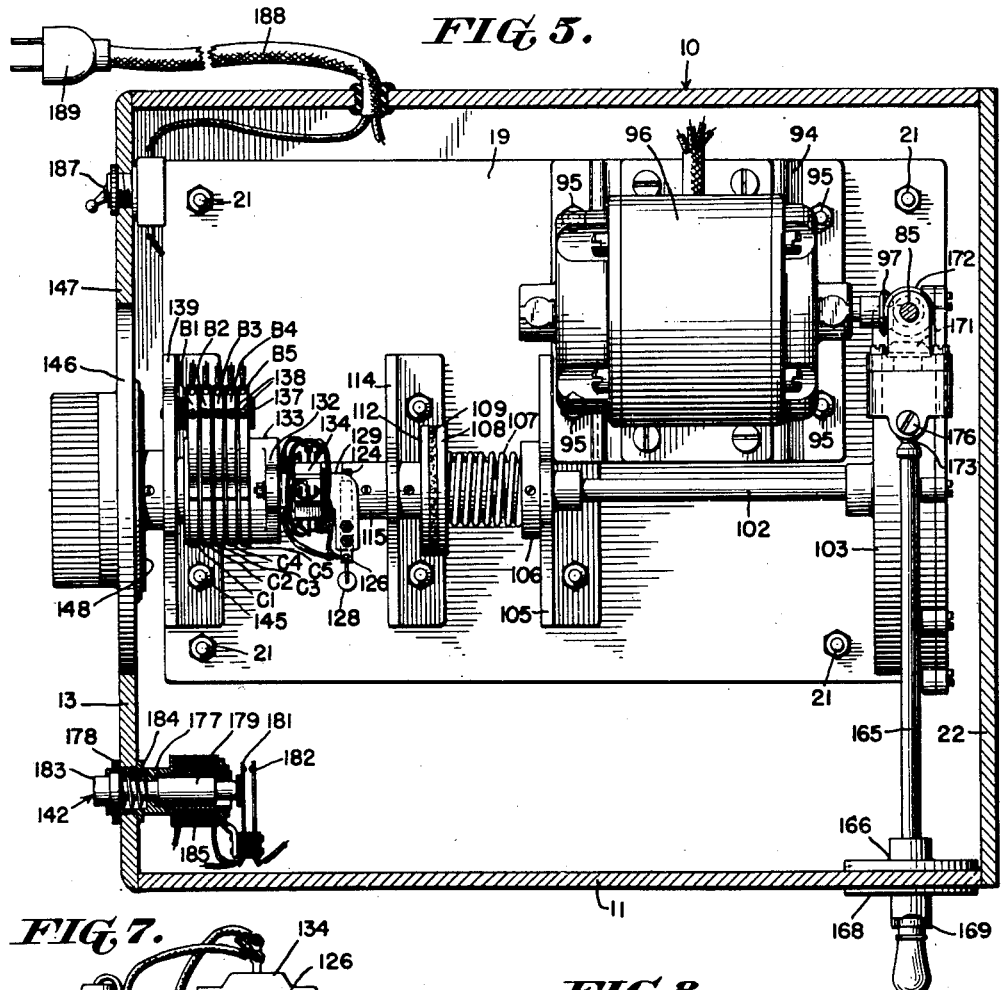
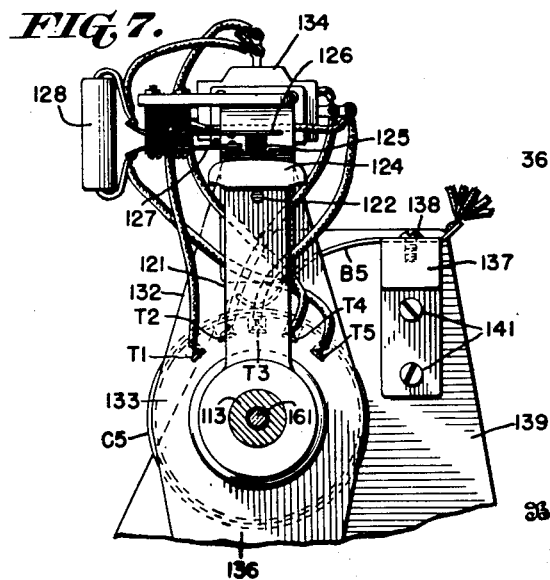
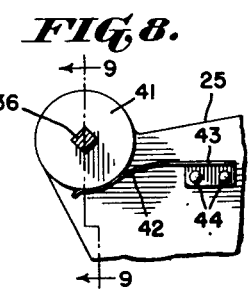
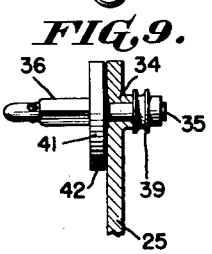
Inventors
R. C. Duncan
R. M. Hicks
By Ralph L Chappell
Attorney

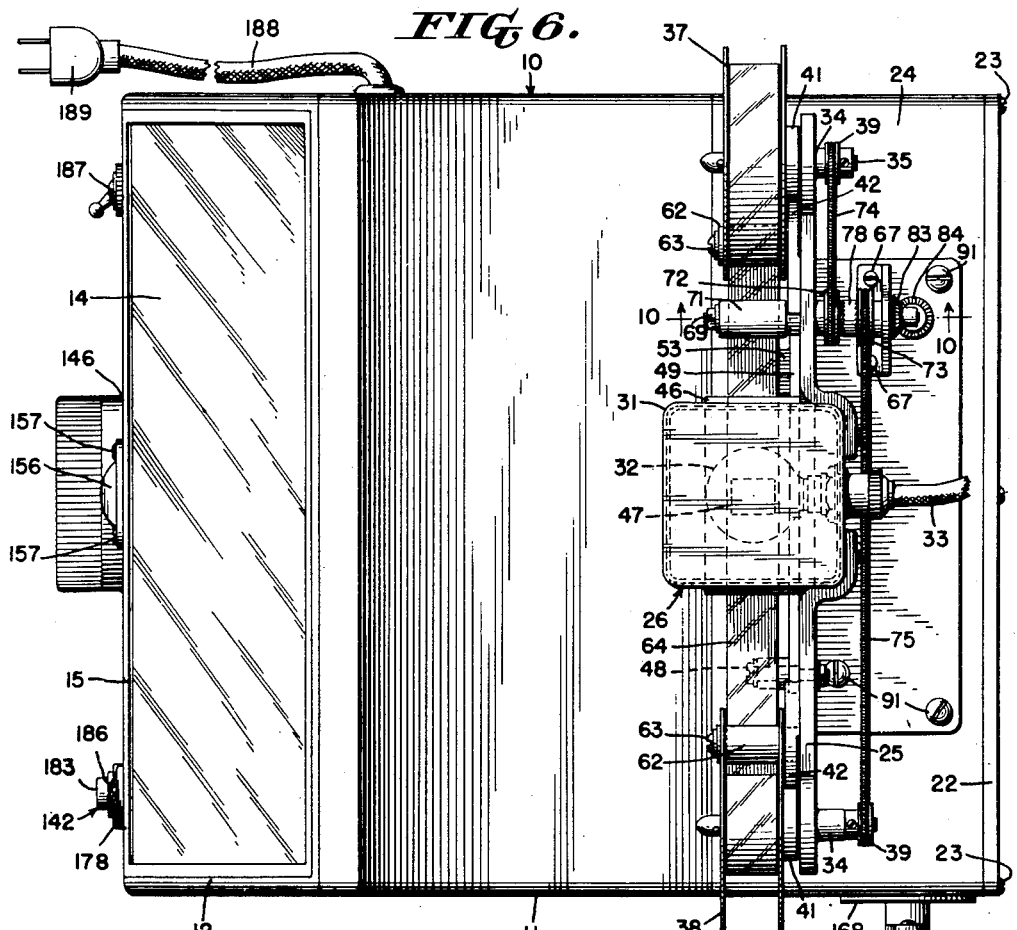

March 15, 1949. R. C. DUNCAN ET AL 2,464,220
FILM RECORD SELECTING AND PROJECTING DEVICE
Filed April 28, 1945 7 Sheets-Sheet 7

Inventors
R. C. Duncan
R. M. Hicks
By Ralph L. Chappell
Attorney

Patented Mar. 15, 1949

2,464,220

UNITED STATES PATENT OFFICE 2,464,220

FILM RECORD SELECTING AND
PROJECTING DEVICE

Robert C. Duncan, Chevy Chase, Md., and
Raymond M. Hicks, Washington, D. C.

Application April 28, 1945, Serial No. 590,868

15 Claims. (Cl. 88—24)

(Granted under the act of March 3, 1883, as
amended April 30, 1928; 370 O. G. 757)

This invention relates to a record selecting device and more particularly to a device for selecting a desired portion of a microfilm for inspection of an enlarged projected image thereon.

It has been found desirable to record the numerous files of records, reports, census documents, and the like, on a microfilm whereby these records may be preserved in "capsule" form by winding a considerable length of the microfilm on a reel. When it is desired to inspect this film, the film is usually inserted within a projector and enlarged images of the records corresponding to frames on the film are moved successively into a display position by turning a crank until the desired record is found. In the devices heretofore employed for this purpose it is, of course, necessary to move the film slowly in order that each of the images formed by the successive frames of the film may be inspected sufficiently to locate the desired record and, in the case of a film having a thousand frames thereon, for example, it will be readily understood that the selection of a particular record may consume considerable time, particularly if the film is moved at such a rate as to cause the selected film to pass the display position without being detected or fail to be detected while passing through the display position through inadvertence or carelessness on the part of the operator. Furthermore, the selection of a particular frame in the manual devices heretofore employed for selecting a desired frame for display is a time-consuming and tedious operation.

In accordance with the present invention these difficulties are overcome by providing a device for automatically selecting any desired frame of the microfilm, in which the film is automatically set into operation by an electrical push button control and the motor is automatically brought to rest with the selected frame in the display position under control of a manually set selector. Furthermore, the film may be moved selectively in any direction from the selected position to another selected position under control of the aforesaid selector. When all of the desired frames on the film have been selected, the film may be automatically rewound by restoring the selector to the initial or starting position. In addition to the foregoing, fine adjustments of the selected film may be obtained, if desired, by manually operative means and without employing the electric motor for this purpose.

One of the objects of the present invention is the provision of means for selecting quickly and positively any desired frame of a microfilm.

Another object is to provide means for arresting the movement of a microfilm when a predetermined length of film has been measured.

Another object is the provision of new and improved means for maintaining a predetermined synchronous relation between the moving microfilm and the selector mechanism.

Another object is to move the film selectively in either direction from a predetermined selected position to another selected position.

Still another object is the provision of new and improved means for decelerating the rate of movement of the film just prior to the movement of a selected frame thereof into the display position, whereby the selected frame does not move past the display position before coming to rest.

A further object is the provision of new and improved means for maintaining the film in continuous motion after movement thereof has been initiated, until the desired frame has been selected.

A still further object is the provision of a device for selecting a particular frame in a microfilm which is strong, durable, economical to manufacture, and possesses the desired qualities of reliability in operation.

Still other objects, advantages and improvements will be apparent from the following description, taken in connection with the accompanying drawings, in which:

Fig. 5 is a view in section taken along the line 5—5 of Fig. 2;

Fig. 6 is a top plan view of the device;

Fig. 7 is an enlarged view of the selector mechanism taken along the line 7—7 of Fig. 2;

Fig. 8 is a detail view of one of the drums and associated friction spring employed with each of the reel shafts;

Fig. 9 is a view taken along the line 9—9 of Fig. 8;

Fig. 10 is an enlarged view of the film driving and reversing mechanism taken along the line 10—10 of Fig. 6;

Figure 1:
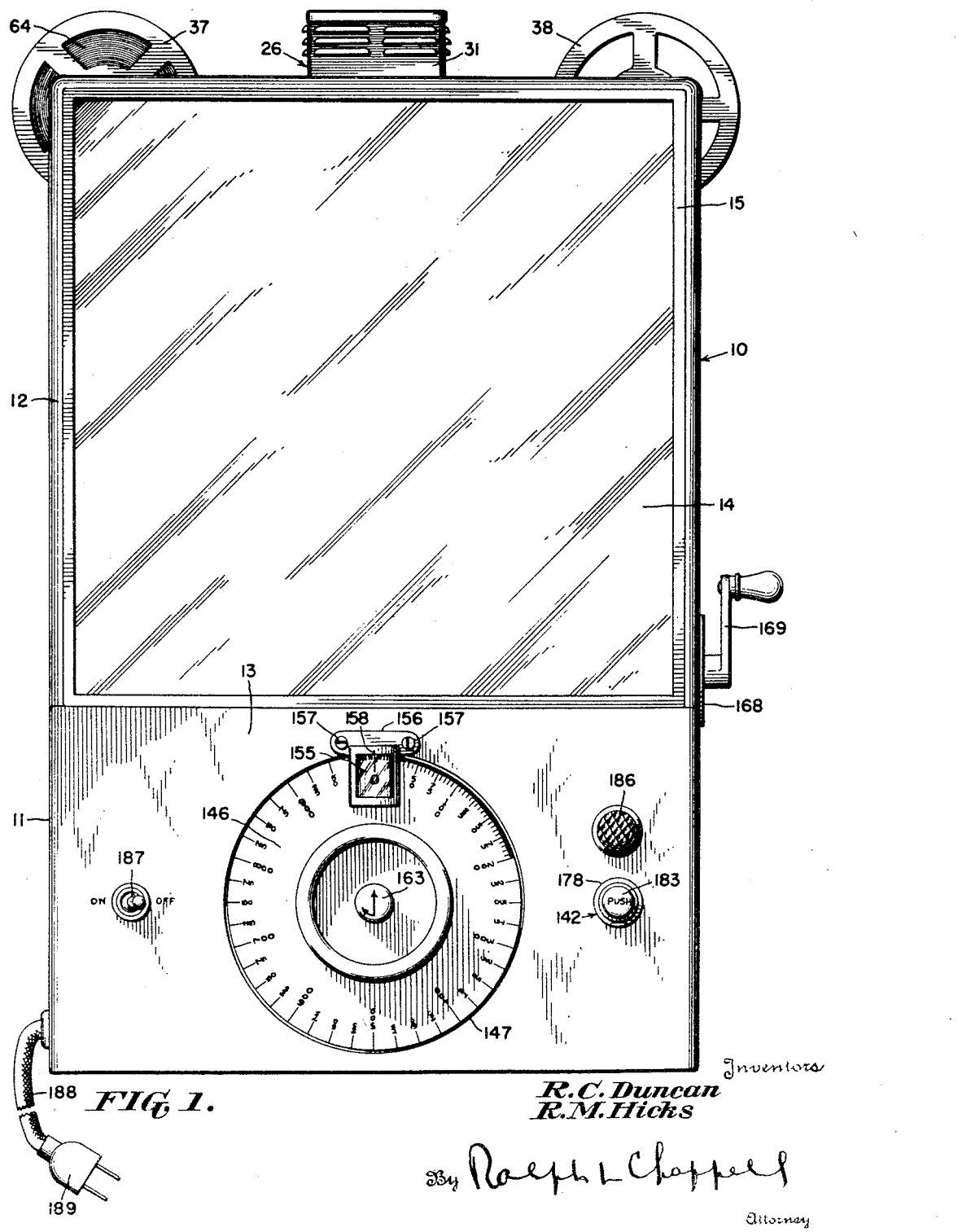
Fig. 1 is a view in front elevation of the device in accordance with a preferred embodiment thereof.

Referring now to the drawings for a more complete understanding of the invention, on which like numerals of reference are employed to designate like parts throughout the several views and more particularly to Fig. 1 thereof, there is shown thereon a microfilm projector and selector indicated generally by the numeral 10, comprising a casing 11 having an inclined portion 12 and a panel portion 13. The inclined portion 12 of the casing is provided with an aperture in which is disposed a projection screen 14 of material suitable for the purpose such, for example, as frosted glass, and arranged within a metal frame 15 secured to the casing as by a retaining member 16 and screws 17, Fig. 2.

The casing 11 also includes a base or plate 18 to which is secured a plate 19 as by the bolts 21, Fig. 5. The casing is adapted to be closed by a rear cover 22 secured thereto as by screws 23.

Figure 2:
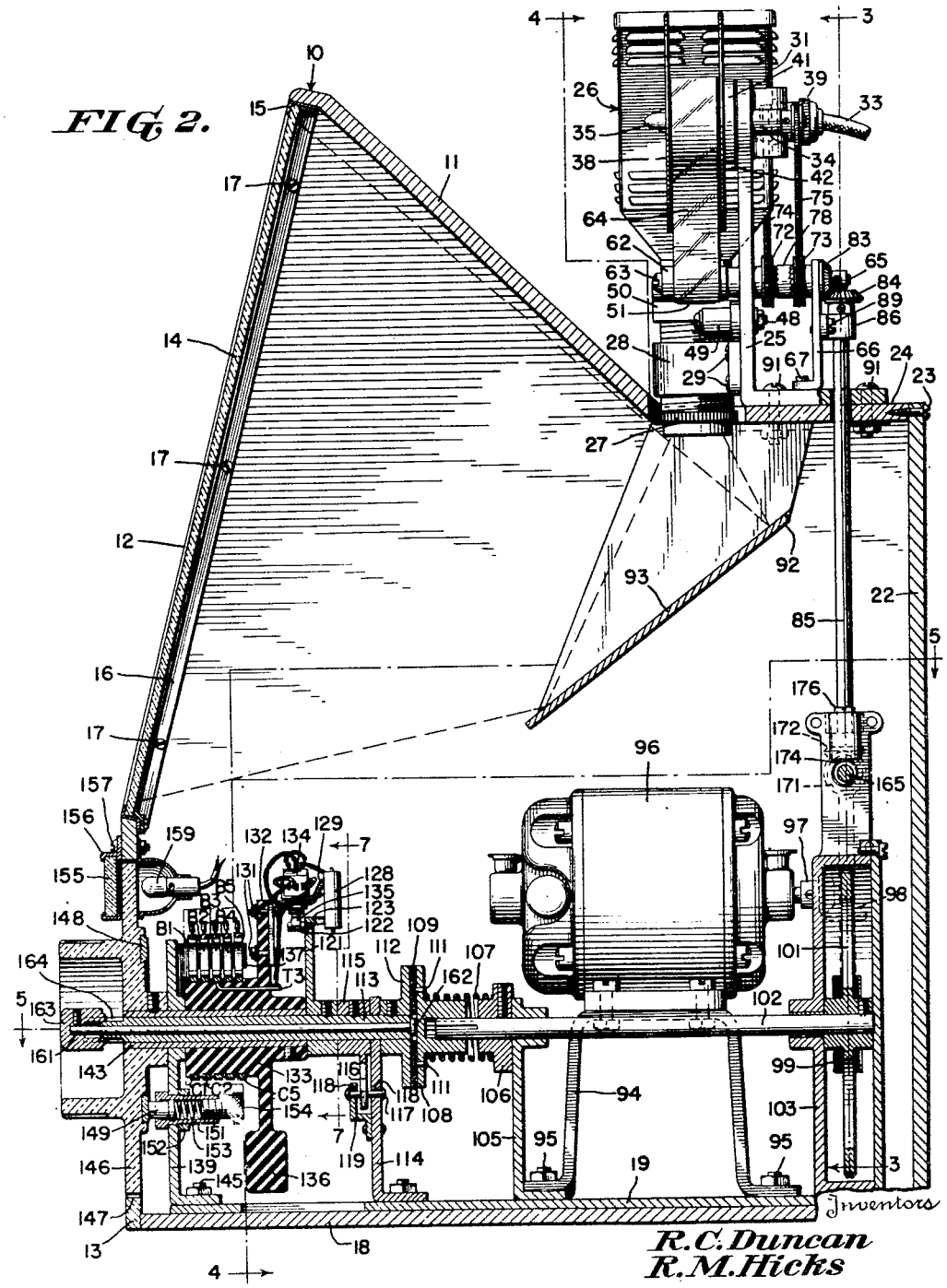
Fig. 2 is a vertical sectional view taken substantially centrally of the device and showing certain portions of the device in elevation.
Figure 4:
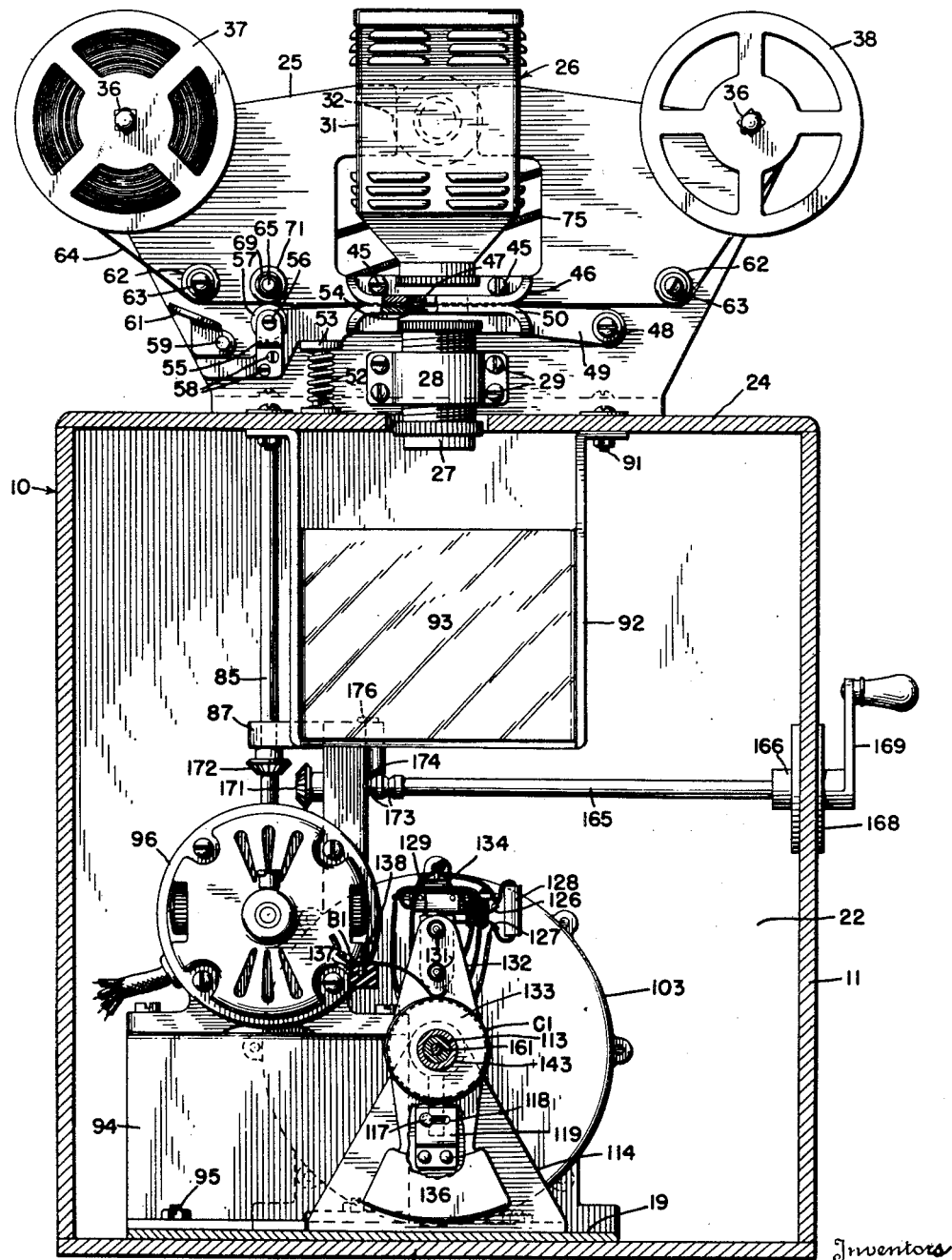
Fig. 4 is a view taken along the line 4—4 of Fig. 2.

The casing 11 also comprises a shelf or ledge 24 to which is secured as by the support 25 a projector designated generally by the numeral 26 of any type suitable for the purpose, comprising a lens assembly including a focusing mount 27, Figs. 2 and 4, adjustably supported within a bracket 28 secured to the support 25 by the screws 29. The projector also includes a lamp housing 31 within which is arranged a projector lamp 32 adapted to be energized by a flow of current through the connecting cord 33. The support 25 is also provided with a pair of bearings 34 having a pair of reel holder shafts 35 rotatably arranged therein. Each of the shafts 35 is provided with a squared portion 36 adapted to receive and support a reel 37 or 38, as the case may be, and provided with a looped pulley 39 adapted to impart rotative movement thereto.

There is also secured to each of the shafts 35 a disc or drum 41, Figs. 8 and 9, adapted to be frictionally engaged by a spring 42 preferably having a bent over portion 43 secured to the support 25 as by the rivets 44.

There is also secured to the support 25 as by the screws 45 a film support 46 having an aperture 47 therein in alignment with the axis of the optical system of the projector. Pivotally supported on the support 25 as by the bearing screw 48 is a film guide arm 49 having a flat portion comprising the film support 50 and adapted to be urged into engagement with the complementary film support 46 by a spring 52 in registered engagement with the tab 53 formed on the arm 49. Each of the film supporting members 46 and 50 is provided with film guide grooves 51, Fig. 2, the member 50 being additionally provided with an aperture 54 of substantially the same size as the aperture 47 within the member 46. Within each of the apertures 46 and 47 is preferably arranged a glass optical flat or plate thereby to maintain the selected frame in a focused position when the film guide arm 49 is in engagement with the film support 46. The arm 49 is also provided with a bearing support 55, Figs. 4 and 10, to which is secured as by the screw 56 a roller 57 of material suitable for the purpose such, for example, as rubber, the support 55 being secured to the arm 49 in any suitable manner as by the screws 58. There is also pivotally secured to the support 25 as by the bearing pin 59 a cam member 61 adapted to be moved downwardly from the position shown on Fig. 4 and thereby to move the arm 49 to a release position. A pair of guide rollers 62 are also secured to the support 25 as by a pair of screws 63 and adapted to be engaged by the microfilm 64 and guide the film as the film is fed from the reel 37 to the reel 38, or vice versa.

As best shown on Fig. 10 a film feed shaft 65 is journaled within the support 25 and a bearing support 66 secured thereto by the screws 67. Secured to an end portion of the shaft 65 as by key 68 and nut 69 is a film feed roller 71 composed of material having a high friction characteristic and small compressibility such, for example, as medium hard rubber or any of the synthetic varieties thereof possessing the desired quality whereby the microfilm 64 is adapted to be moved in either direction and metered by the roller 71. There is also rotatably mounted on the shaft 65 a pair of pulleys 72 and 73 connected by the belts 74 and 75 to the pulleys 39 associated with the reels 37 and 38, respectively. Each of the pulleys 72 and 73 is provided with a plurality of ratchet teeth 76 and 77 respectively and adapted to be engaged by the clutch member 78 selectively in accordance with the direction of rotation of the shaft 65. A clutch member 78 is slideably mounted on an enlarged portion 79 of the shaft 65 and adapted to move axially with respect thereto, rotational movement between the clutch member and the shaft being prevented by a pin 81 passing through the shaft 65 and engaging a pair of diametrically disposed key ways 82 within the clutch member 78. By including an enlarged portion 79 on the shaft 65 in the manner disclosed, an arrangement is provided for maintaining the pulleys 72 and 73 in predetermined axial spaced relation such that the clutch member 78 is in engagement with one or the other of the pulleys 72 and 73, selectively, depending upon the direction of rotation of the shaft.

Figure 3:
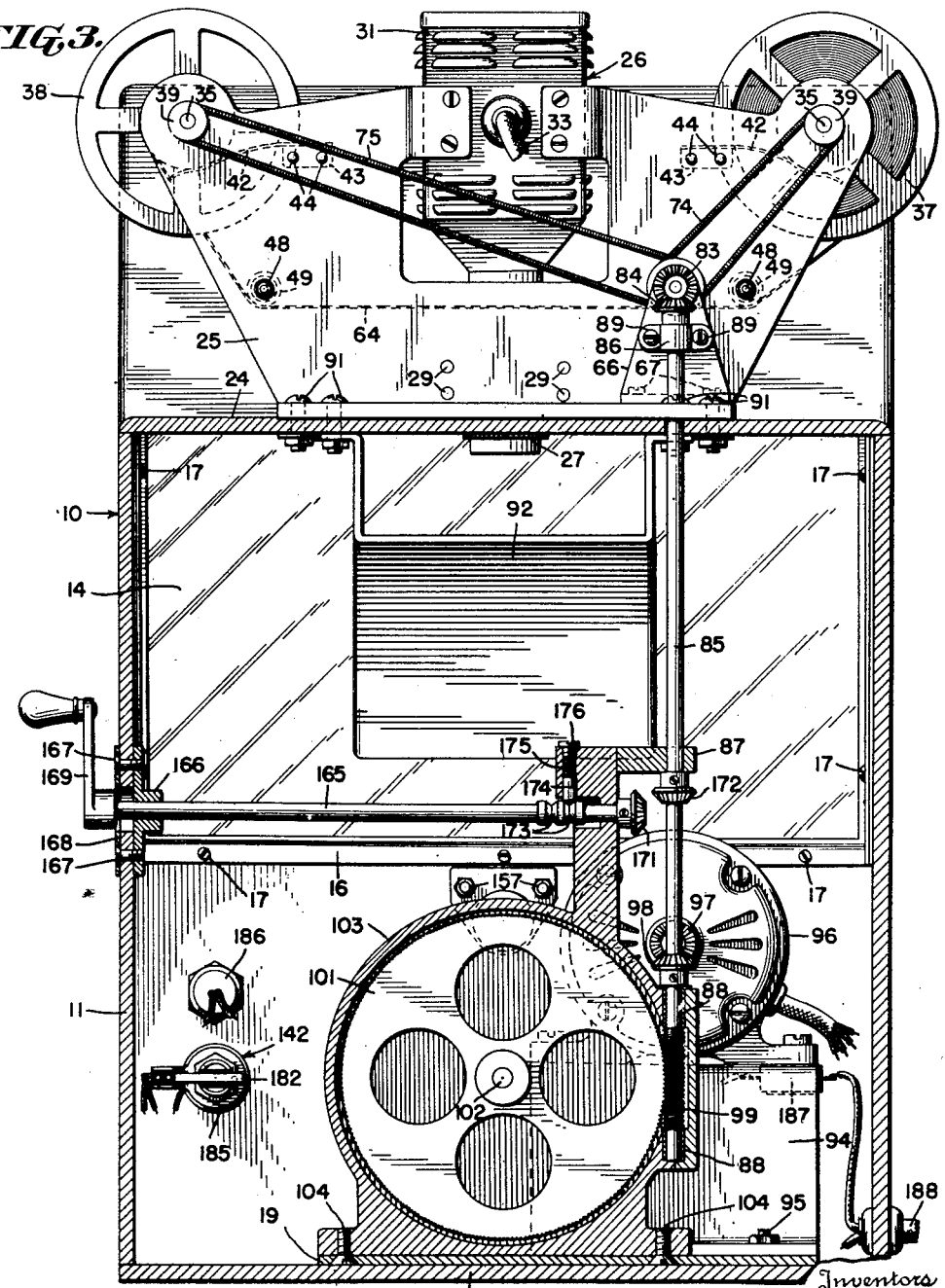
Fig. 3 is a view of the device taken substantially along the line 3—3 of Fig. 2.

Secured to the shaft 65 is a bevel gear 83 in meshed engagement with a bevel gear 84 secured to a shaft 85 journaled within the bearings 86, 87 and 88, Fig. 3. The bearing 86 is secured as by the screws 89 to the support 66. The support 25 on the casing 11 and the shelf 24 of the casing are provided with suitable apertures within which the shaft 85 is rotatably disposed. The support 25, it will be noted, may be secured to the shelf 24 in any convenient manner as by the bolts 91. Supported by a pair of the bolts 91 is a light reflecting member 92 having a flat surface 93 adapted to reflect the rays of light from the projector onto the projection screen 14.

Supported as by the bracket 94 secured to the plate 19 by the bolts 95 is a reversible electric motor 96 having a bevel gear 97 thereon in engagement with the complementary gear 98 secured to the shaft 51. The motor 96 is preferably a low-speed motor of the reversible type and may, if desired, comprise a plurality of reduction gears whereby the film feed roller 71 rotates at a safe speed as the motor operates. The lower end of the shaft 85 is formed into or provided with a worm gear 99 in meshed engagement with the worm wheel 101, the worm wheel being secured to a shaft 102 journaled at an end portion thereof within a housing 103 secured to the plate 19 as by the screws 104. The shaft 102 is journaled adjacent the opposite end thereof within the member 105 and provided with a thrust collar 106 in registered engagement with the spring 107. The end of the shaft is in engagement with a slideable clutch member 108 preferably having a lining or facing 109 secured thereto as by rivets 111. The clutch facing is normally maintained in engagement with the complementary clutch member 112 as by the spring 107. The member 112 is secured to a tubular shaft 113 journaled within the support 114. There is also secured to the tubular shaft 113 a stop member 115 comprising an arm 116 adapted to engage a stop pin 117 slideably arranged within a slotted portion 118 in the bracket 119 and in the support 114 respectively, of sufficient length such that the stop member 115 is adapted to make one full revolution before being arrested by the stop pin 117.

There is also secured to the tubular shaft 113 a selector arm 121 having a switch operating pin 122 secured thereto near the outer end thereof, the outer end of the arm being offset as at 123 and provided with a cam surface 124, adapted to engage the insulated member 125 and move the contact spring 126 out of normal engagement with the contact spring 127, Fig. 7, a predetermined number of frames in advance of a desired frame before the desired frame of the microfilm is moved into alignment with the apertures 47 and 54 of the film supports regardless of the direction of movement of the selector arm, the contact springs remaining disengaged as the film comes to rest with the selected frame thereof in the display position.

The motor speed control switch comprising the contact springs 126 and 127 is adapted to shut the resistor 128 connected thereto at all times when the insulated cam follower 125 is not engaged by the cam 124. The contact springs 126 and 127 are supported by an L-shaped bracket 129 secured as by the bolts 131 to an arm 132 projecting outwardly from a hub 133 and preferably formed integrally therewith, the hub being composed of insulating material suitable for the purpose such, for example, as Bakelite, hard rubber or the like.

Figure 11:
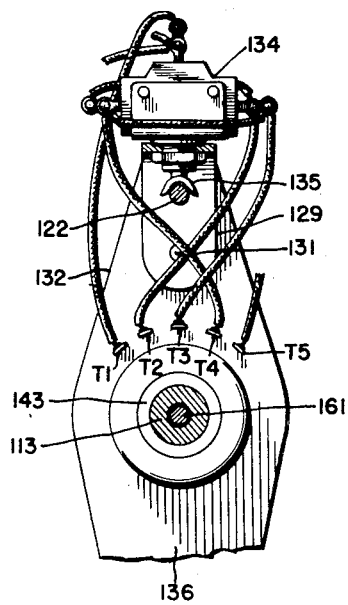
Fig. 11 is an enlarged view of the selecting and motor control mechanism viewed from the rear, partially broken away, when the selector dial and clutch release knob are in the initial position shown in Fig. 1.

The bracket 129 has secured thereto as by the nut 131, Fig. 11, a 3-position triple pole motor control toggle switch 134 having a switch actuating element comprising a bifurcated member 135 adapted to be engaged by the pin 122 in response to relative movement between the selector arm 121 and the arm 132 and move the switch contact elements to any of the three switch positions. There is also formed on the hub 133, and preferably integrally therewith, a counterweight 136 adapted to counterbalance the arm 132 and the switching equipment controlled thereby.

Figure 14:
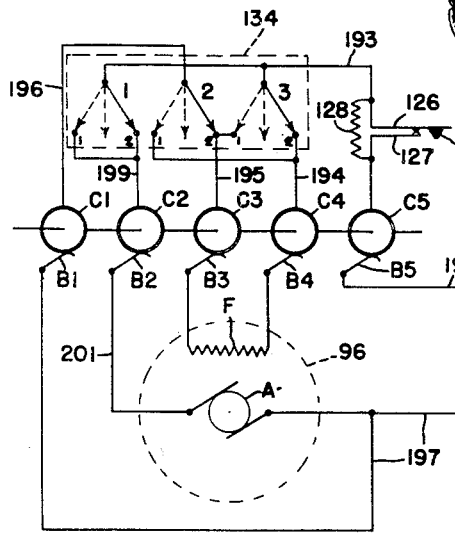
Fig. 14 shows in diagrammatic form a complete circuit arrangement suitable for use with the device.

There is also formed on the hub 133, five contact rings, C1, C2, C3, C4 and C5, Figs. 2, 5 and 14, provided with terminals T1, T2, T3, T4 and T5, respectively connected thereto for establishing an external connection between each of the contact rings and the circuit controlling equipment secured to the arm 132. Secured to an L-shaped mounting strip 137 as by the screws 138 are a plurality of contact springs or brushes, B1, B2, B3, B4 and B5, adapted to be maintained in continuous contact with the contact rings C1 through C5 respectively, when the block 137 is secured to the bearing support 139 by the screws 141. The brushes B1 through B4 are provided with conductors for establishing electrical connections between the brushes and the motor 96 and the brush B5 is provided with a conductor for establishing an electrical connection to the push button start switch 142, Fig. 14.

The hub 133 is secured in any suitable manner to the tubular shaft 143, disposed about the shaft 113 and rotatable with respect thereto.

The shaft 143 is journaled within a bearing support 139 secured to the plate 19 as by the bolts 145. There is also secured to the shaft 143 a selector dial 146 composed of transparent or opaque material such, for example, as Lucite, and adapted to be rotated within a circular aperture 147 within the panel portion 13 of the casing 11. The dial is preferably provided with an annular insert 148 adapted to be frictionally engaged by a plunger 149, Fig. 2, slideably disposed within a tubular member 151, secured to the support 139 as by the nut 152. The friction between the plunger 149 and the member 148 is controlled by a spring 153 arranged within the tubular member 151 and the adjusting screw 154 and is sufficient to prevent fortuitous rotative movement of the selector dial during a selecting operation of the device but is insufficient to prevent accurate manual operation of the dial to any selecting position thereof.

There is provided about the outer portion of the dial a plurality of uniformly spaced scale divisions corresponding respectively to successive frames of the microfilm and a plurality of scale markings therefor, preferably 1000 such divisions being conveniently arranged on the scale with the division 1000 coinciding with the 0 marking thereon. There is also provided a cylindrical magnifying lens 155 arranged within the support 156 secured to the panel 13 as by the screws 157 and having a reference line 158 with which any of the scale divisions on the dial corresponding to frames to be selected may be brought into substantial alignment, the setting of the dial in a selected position being facilitated by reason of the magnification of the scale divisions and the scale markings adjacent the reference line 158.

The adjustment of the dial is further facilitated by the provision of a dial lamp 159 in alignment with the cylindrical lens 155 and arranged immediately behind that portion of the dial covered by the lens.

Within the tubular shaft 113 is arranged a plunger or rod 161 having an enlarged end or head 162 thereon adapted to engage the slideable clutch member 108 and disengage the clutch as the plunger is moved inwardly. The opposite end of the plunger 161 is secured to a clutch release knob 163 in splined engagement as at 164 with the tubular shaft 113. The tubular shaft 113 and the selector arm 121 secured thereto may be rotated by the knob 163 to the initial starting position from any moved position thereof while the knob is pressed inwardly sufficiently to disengage the clutch, in which starting position the shaft 113 is arrested by the arm 116 coming into contact with the stop pin 117 and moving the stop pin to the limit of its travel within the slotted portions 118 of the support 114 and bracket 119 respectively.

There is also provided a shaft 165 journaled at one end thereof to an upstanding portion of the housing 103, Fig. 3, and at the opposite end thereof within the bearing member 166 secured to the casing 11 as by the screws 167 and clamping member 168. The shaft is provided at the outer end thereof with a crank 169 and at the inner end with a bevelled gear 171 adapted to engage a complementary gear 172 secured to the shaft 85 as the crank is moved inwardly from an initial position to an engaged position. The shaft is also provided with a pair of annular recessed portions 173 adapted to be engaged by a plunger 174 slideably arranged within the housing 103 and urged against the shaft by a spring 175 and a retaining screw 176, Fig. 3. An arrangement is thus provided in which the selected frame may be adjusted, if desired, to cause the enlarged image thereof to appear at any desired portion of the projection screen 14 and provide a convenient arrangement for moving consecutive frames in successive order to the display position, it being merely necessary to press the crank 169 inwardly sufficient to cause engagement of the gears 171 and 172 to establish a manual control connection to the film. The plunger 174 and the grooves 173 maintain the gears 171 and 172 either engaged or disengaged, as the case may be, for as long a time as desired.

The push button start switch 142 comprises a cylindrical mounting 177, Fig. 5, secured to the panel 13 in any well known manner as by the nut 178. Slideably arranged within the mounting 177 is a plunger 179 adapted to move the contact spring 181 into engagement with a contact spring 182 as the plunger is moved inwardly in response to digital pressure applied to the push button 183. The plunger is normally urged to an outward release position by a spring 184. When moved inwardly to a contact closing position, however, the plunger is maintained operated by current flowing through the winding 185 until the motor operating circuit has been interrupted as the selected frame moves into the display position. When this occurs the plunger is restored to an unoperated position by the spring 184. Closure of contacts 181 and 182 causes the lamp 186 secured to the panel 13 to be lighted as an indication that a frame selecting operation is in progress. There is also provided on the panel 13 a toggle switch 187 having an "on" position and an "off" position and adapted to connect the selector projector device to a source of electrical power when the switch is actuated to the "on" position, the electrical connection between the device and the source of power being preferably established by the conductors within the cable 188 and the plug 189.

The operation of the projector selector will now be described. Let it be assumed, by way of example, that it is desired to select for projection and display, frame 250 from a microfilm having 1,000 frames wound on the reel 37 and let it further be assumed that the plug 189 is connected to a source of power. The switch 187 is now moved to the "on" or closed position thereby causing the dial lamp 159 and the projector lamp 32 to light, Fig. 14.

The film guide arm 49 is locked to the open position by the cam member 61 and the microfilm is threaded into the machine and the end thereof secured to the reel 38 substantially as shown in Fig. 4. Cam member 61 is moved upwardly thereby causing the film guide arm 49 to be moved to the closed position by spring 52 and thus maintain the film in a predetermined focused position with respect to the projector. The reels 37 and 38 are now manipulated sufficiently to bring the 0 frame of the microfilm into the display position beneath the aperture 47 of the film support 46 or, if desired, the adjustment of the film with the 0 frame in the display position may be effected by means of the crank 169. In the event that the crank is employed for this purpose, the crank should be withdrawn axially after adjustment of the film sufficiently to disengage the gears 171 and 172.

The knob 163 is now pressed inwardly sufficiently to disengage the clutch members 108 and 112 and the knob is rotated clockwise until arrested by the stop pin 117. The knob 163 is now released, thereby causing the clutch members to be engaged with the selector arm 121 in an initial starting position corresponding to the instant setting of the 0 frame of the microfilm in the display position. The selector dial is now moved to position 250 with the scale marking 250 thereof in alignment with the reference line 158. The device is now set to select frame 250 of the microfilm.

Figure 12:
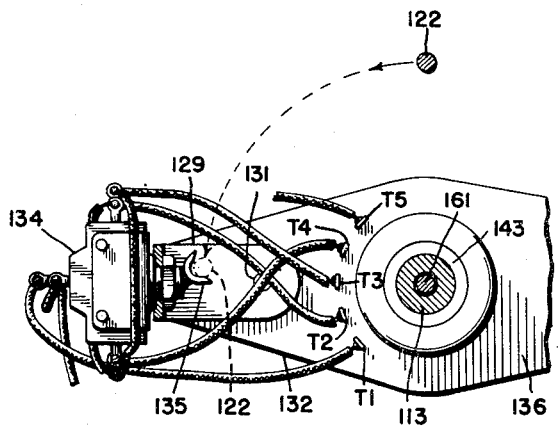
Fig. 12 is a view similar to Fig. 11 but with the arm controlled by the selector dial moved to a selecting position and the motor control switch in a closed position.

As the selector dial was moved to position 250 the arm 132 controlled thereby was moved to the position shown on Fig. 12 and the bifurcated member 135 of the switch 134 secured thereto was also moved into the position shown on Fig. 12. The switch operating pin 122 mounted on the selector arm 121 will be in the position shown in the solid outline, Fig. 12, for the reason that the selector arm 121, it will be recalled, is in the initial operating position.

The push button 183 of the switch 142 is now momentarily depressed thereby causing the lamp 186 to light as an indication that a selecting cycle of operations has been initiated. The operation of the selecting system will best be understood by consideration of Fig. 14 on which is shown in diagrammatic form the various circuits and electrical apparatus comprising the electrical control system. As the contacts 181 and 182 are closed in response to the operation of push button 183 a circuit is completed from the source of power by way of conductor 191 to contacts 182 and 181, winding 185 of the switch 142, conductor 192, brush B5 and ring C5, contacts 127 and 126 of the motor speed control switch, conductor 193, arm 3 and contact 2 of the motor control switch 134, conductor 194, contact ring C4 and brush B4, field winding F of the motor 96, brush B3 and contact ring C3, conductor 195, contact 2 and arm 2 of switch 134, conductor 196, contact ring C1 and brush B1, conductor 107, switch 187 and conductor 198 to the source of power. A circuit is also closed from conductor 193 by way of arm 1 and contact 2 of switch 134, conductor 199, contact ring C2 and brush B2, conductor 201, to armature A of the motor 96 and thence to conductor 197, thereby energizing winding 185 of switch 142 and causing contacts 181 and 182 thereof to remain closed after the pressure on the push button 183 has been removed. The motor 96 is set into operation over the circuit just described in a direction to cause the film feed roller 71 to unwind the film from the reel 37. As the motor starts to rotate, the clutch member 78 is brought into operative engagement with pulley 73 thereby removing the driving connection between the shaft 65 and pulley 72, and locking pulley 73 to the shaft 65, whereby a driving force is applied to the reel 38 by way of the belt 75 sufficient to wind the microfilm on the reel 38 and maintain the microfilm in a taut condition between the feed roller and the reel 38. The reel 37, it will be recalled, is operatively connected to a drum 41 against which friction is continuously applied by the spring 42 and thus an excess of film is prevented from being unwound from the reel 37 while the film is being withdrawn therefrom by the film feed roller 71. An arrangement is thus provided in which the length of film unwound from the reel 37 is metered by the feed roller and is proportioned to the extent of angular movement of the selector arm 121.

When the selector arm 121 has moved from the initial position thereof through an angle corresponding substantially to the length of film comprising 225 consecutive frames, the cam member 124 engages the insulated member 125 sufficiently to move contact spring 126 out of engagement with contact spring 127 thereby removing a short circuit across the resistor 128. When this occurs the motor speed is reduced sufficiently to prevent overthrow of the selected frame beyond the display position thereof when the motor circuit is interrupted.

Figure 13:
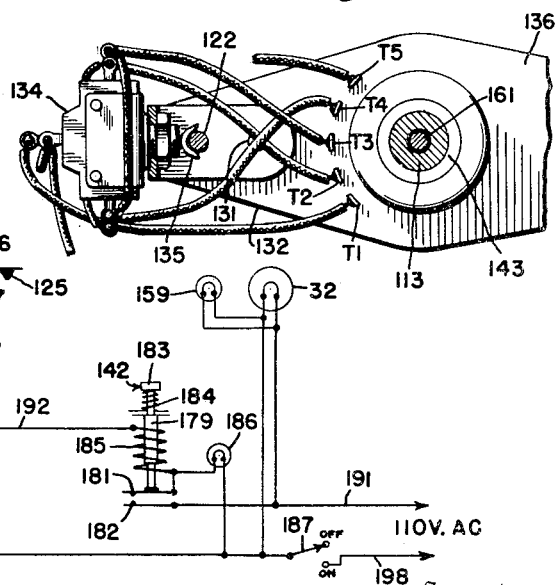
Fig. 13 is a view similar to Fig. 12 showing the motor control switch in the open position as the film moves into a selected position.

As the selected frame of the microfilm is about to move into the display position thereof, the selector arm 121 is moved ahead sufficiently for the switch operating pin 122 thereof to engage the forked member 135 of the toggle switch 134 and cause the switch arms thereof to be disengaged from their contacts 2 thereby interrupting the circuit to the motor and causing the start switch 142 to release. As contact 182 moves away from contact 181 of the start switch the operating circuit to the lamp 186 is interrupted and the lamp is extinguished. The motor now comes to rest with the selected frame 250 in the display position and the pin 122 in substantial alignment with the fork member 135 of the switch 134, Fig. 13.

Let it now be assumed, for the purpose of description, that the operator desires to select frame 139 for display. The selection dial 146 is now moved to position 139 and the start button 142 is operated. As the selector dial moves away from position 250 the arm 132 is moved in a clockwise direction from the position shown on Fig. 13 thereby causing the fork member 135 to be moved downwardly and the arms of switch 134 to be moved into engagement with their respective contacts 1. As the selector dial moves past position 225 the cam 124 is disengaged from the insulated member 125 thereby causing contact spring 126 to be moved into engagement with contact spring 127 and short circuit resistor 128.

The operation of start switch 142 causes the lamp 186 to light and close a circuit from power on conductor 193 by way of arm 3 and contact 1 of switch 134, conductor 195, contact ring C3 and brush B3, field F of the motor, brush B4 and contact ring C4, conductor 194, contact 1 and arm 2 of switch 134, conductor 196, contact ring C1 and brush B1, from whence the circuit is completed to power on conductor 197 thereby reversing the motor field connections between conductors 192 and 197. The connections between the armature A of the motor and conductors 192 and 197, however, are not reversed, for the reason that contacts 1 and 2 of arm 1 of switch 134 are electrically connected together. The motor operates in a reverse direction over the circuit just traced, thereby causing the film feed roller to rotate in a direction to rewind the microfilm on reel 37 and the selector arm 121 is moved in a clockwise direction concurrently therewith. The reversal of the shaft 65 causes the clutch member 78 to be disengaged from pulley 73 and brought into engagement with pulley 72 thereby applying a driving force to the reel 37 by means of the belt 74, in a direction to rewind the film on the reel 37.

The reel 38 is now operated reversely by the film, excessive travel of the reel 38 being prevented by the drum 41 and spring 42 associated therewith. As the frame 164 moves past the display position, the contact springs 127 and 126 of the motor speed control switch are disconnected, thereby removing the shunt from the resistor 128 and reducing the speed of the motor. As frame 139 moves into the display position the arms of switch 124 are disengaged from their contacts 1 thereby releasing switch 142, extinguishing lamp 186 and bringing the motor to rest with the selected frame 139 in the display position.

Let it now be assumed that the operator desires to select frame 140. This may be best accomplished by moving the crank 169 inwardly such that gears 171 and 172 are in mesh, and rotating the crank in the proper direction to bring frame 140 into full view on the projector screen. The crank is now withdrawn sufficiently to disengage gears 171 and 172.

Let it now be assumed that the operator desires to select frame 615 for projection and inspection. The selector dial is moved to position 615 and the start switch 142 is operated. As the selector dial is moved away from position 139 in the assumed example, the arms in switch 134 are moved into engagement with their contacts 2 and as the selector dial passes position 165 contacts 126 and 127 are engaged, thereby shorting the resistor 128. The operation of the start switch causes the motor to operate in a direction to transfer the microfilm from reel 37 to reel 38. As the feed roller shaft 65 starts to rotate the clutch member 78 is disengaged from pulley 72 and brought into engagement with pulley 73 thereby driving the reel 38 by means of the belt 75 sufficiently to maintain the microfilm between the feed roller and the reel 38 in a taut condition.

As frame 590 moves past the display position, contacts 126 and 127 are disengaged thereby removing the shunt from resistor 128 and reducing the speed of the motor. As the selected frame 615 moves into the display position the arms of switch 134 are disengaged from their respective contacts 2, thereby releasing switch 142, extinguishing lamp 186 and bringing the motor to rest with the selected frame 615 in the display position.

When it is desired to rewind the film on reel 37, the selector switch is moved in a clockwise direction to position 0 and the start switch 142 is operated, thereby lighting the lamp 186 and causing the motor to run in a direction to rewind the film on reel 37. As shaft 65 starts to rotate the clutch member 78 is disengaged from pulley 73 and brought into operative engagement with pulley 72, thereby applying a rewinding force to the reel 37 by means of belt 74. As frame 25 moves past the display position during the rewinding operation, the contacts 126 and 127 are disengaged, thereby removing the shunt from resistor 128 and reducing the speed of the motor. As frame 0 moves into the display position the arms of switch 134 are disengaged from their contacts 1, thereby releasing switch 142, extinguishing lamp 186 and bringing the motor to rest with the 0 frame opposite the display position.

Whereas, the preferred embodiment of the invention has been described with reference to a projecting and selecting device adapted to select any desired frame from a film of 1,000 frames or less, it will be understood that this has been done merely for the purpose of description and that the device may be adapted to select frames on films having a greater number of frames by proper selection of the gear ratios and arrangement of the indicia and scale divisions on the selecting dial. Furthermore, whereas in the assumed example, the motor control speed switch contacts were operated 25 frames ahead of the selected frame it will, of course, be understood that this has been done merely for the purpose of description as the motor control switch may be operated a greater or lesser number of frames ahead of the selected frame, as may be found desirable to effect a quick and accurate selection of a desired frame appearing on the microfilm.

Whereas, also, in the illustrated embodiment of the invention the film is metered by a film feed roller in frictional engagement with the film, it will, of course, be understood that, if desired, the feed wheel or roller may be provided with teeth adapted to co-act with perforations in the film without relying upon the frictional characteristic of the film feed wheel to meter the film.

Briefly stated, the present invention contemplates the provision of a selecting device particularly adapted to select a desired portion of a microfilm for inspection of an enlarged projected image thereof in which the desired portion of the film is identified by a frame corresponding to intelligence of numeral significance adapted to be pre-set on a selector and in which the selecting operation is automatically controlled from the selection information thus set up. Furthermore, the device of the present invention is adapted to operate the film selectively in either direction from any setting thereof to a new setting and to restore the film to a wound condition on the reel when all of the selected frames have been inspected.

Whereas the invention has been described with reference to a particular example thereof which gives satisfactory results, it will be understood by those skilled in the art, after understanding the invention, that various changes and modifications may be made without departing from the spirit and scope of the invention and it is our intention, therefore, in the appended claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. In a device of the character disclosed for selecting a desired frame of a film for display, a reel having a length of film wound thereon, a projector, a second reel on which the film is adapted to be wound, means for guiding the film in display relation through said projector as the film travels from one to other of said reels, film driving means including a motor, a selector arm operatively connected to said motor and adapted to move rotatably through an angle corresponding to the length of film transferred from one to the other of said reels, motor control means, means settable at will for moving the motor control means to a setting corresponding to a particular frame on said film to be selected, and means on said arm adapted to co-act with said motor control means and bring the motor to rest with the selected frame of the film in a display position with respect to said projector as the selector arm moves to a position corresponding to the instant setting of said motor control means.

2. In a device of the character disclosed for selecting a desired frame of a film for display, a reel having a length of film wound thereon, a projector, a second reel on which the film is adapted to be wound, means for guiding the film in display relation to said projector as the film travels from one to the other of said reels, film driving means including a reversible motor, a selector arm operatively connected to said motor and adapted to move rotatably in either direction through an angle corresponding to the length of film transferred from one to the other of said reels, motor control and reversing means, rotatable frame selecting means settable at will in either direction from a predetermined setting to a desired setting for moving the motor control means to a setting corresponding to a particular frame on said film to be selected, and means on said arm adapted to co-act with said motor control means and bring the motor to rest with the selected frame of the film in a display position with respect to said projector as the selector arm moves in either direction to a position corresponding to the instant setting of said motor control means.

3. In a device of the character disclosed for selecting a desired frame of a film for display, a reel having a length of film wound thereon, a projector, a second reel on which the film is adapted to be wound, means for guiding the film in display relation to said projector as the fim travels from one to the other of said reels, film driving means including a reversible motor, a selector arm operatively connected to said motor and adapted to move rotatably in either direction through an angle corresponding to the length of film transferred from one to the other of said reels, motor control and reversing means, a frame selecting device rotatable at will in either direction from a predetermined setting to a desired setting, means on said frame selecting device for moving the motor control and reversing means to a setting corresponding to a particular frame on the film to be selected, and means on said arm adapted to co-act with said motor control and reversing means and control the direction of rotation of said motor selectively in accordance with the direction of movement of the frame selecting device from said predetermined setting.

4. In a device of the character disclosed for selecting a desired frame of a film for display, a reel having a length of film wound thereon, a projector, a second reel on which the film is adapted to be wound, means for guiding the film in display relation to said projector as the film travels from one to the other of said reels, film driving means including a reversible motor, a selector arm operatively connected to said motor and adapted to move rotatably in either direction through an angle corresponding to the length of film transferred from one to the other of said reels, motor control and reversing means, a frame selecting device rotatable at will in either direction from a predetermined setting to a desired setting, means on said frame selecting device for moving the motor control and reversing means to a setting corresponding to a particular frame on the film to be selected, means on said arm adapted to co-act with said motor control and reversing means and control the direction of rotation of said motor selectively in accordance with the direction of movement of the frame selecting device from said predetermined setting, and means for bringing the motor to rest with the selected frame in a display position with respect to said projector as the selector arm moves to a position corresponding to the instant setting of the motor control and reversing means.

5. In a selecting apparatus for a microfilm having a plurality of records thereon, in combination, a projector, actuating means including a motor for moving the film selectively in either direction past a display position within said projector, a selector arm operatively and releasibly connected to said film actuating means and rotatable concurrently therewith, manipulative means for momentarily disconnecting the selector arm from said film actuating means, means on said manipulative means adapted to move the selector arm to a predetermined initial position corresponding to a predetermined record of said film disposed in said display position while the arm is disconnected from said film actuating means, a control dial having a plurality of scale divisions and indicia therefor corresponding respectively to said records, means including a reference line in proximate spaced relation to said scale divisions for indicating the settings of said dial, a motor control device adapted to be moved by said dial to different settings corresponding respectively to the settings of the dial, and means on said selector arm adapted to engage said motor control device when the arm has moved from said initial position into predetermined spaced relation with respect thereto and thereby stop the motor with a selected record in said display position, said selected record corresponding to the instant setting of the dial.

6. In a microfilm selecting and display device, in combination, a pair of reels having a continuous strip of microfilm wound thereon, means for supporting said reels for rotation in predetermined spaced relation, a pair of pulleys respectively connected to each of said reels and having a pair of belts respectively engaged therewith, a rotatable shaft having a pair of pulleys rotatably mounted thereon and in engagement with said belts respectively, means including a motor for operating said shaft selectively in either direction, a clutch on said shaft adapted to engage said last named pair of pulleys selectively in accordance with the direction of rotation of the shaft thereby to transfer a length of film from either one to the other of said reels, a selector arm operatively connected to said motor and rotatable in either direction thereby, a dial having an initial setting and adapted to be moved in either direction from a moved setting to another moved setting corresponding to a predetermined record on said microfilm, a motor reversing switch adapted to be moved to different settings by said dial and having a switch actuating element for controlling the direction of rotation of the said motor and for stopping the motor when the actuating element is in a predetermined position, means on said arm adapted to engage said actuating element and move the actuating element to said predetermined position when the arm has been moved to a position corresponding to the instant setting of said dial thereby to bring the microfilm to rest with a selected record in a display position, said switch actuating element being adapted to be moved in either direction from said predetermined position selectively in accordance with the direction of movement of the dial from said instant setting and thereby control the direction of rotation of said motor.

7. In a device of the character disclosed for selecting a predetermined portion of a microfilm for display, film actuating means including a motor, a selector arm operatively connected to said motor and adapted to be rotated thereby while said film is being actuated, a selector dial settable at will to different settings corresponding respectively to different portions of the microfilm to be selected, a motor operating circuit, motor reversing and stopping means included in said operating circuit and adapted to be moved by said dial to different positions respectively corresponding to the settings of the dial, means on said arm for actuating said motor reversing and stopping means to a motor stopping position as the arm moves into predetermined spaced relation with respect thereto thereby to interrupt said operating circuit and stop the motor with a selected portion of said microfilm corresponding to the instant setting of the selector dial in a display position, and means controlled by said arm for reducing the speed of the motor when the arm has moved into predetermined spaced relation with respect to the motor reversing and stopping means prior to the interruption of said motor operating circuit.

8. In a device for selecting a desired frame of a microfilm for the display of an enlarged image thereof, in combination, a projector, means including a motor for moving the film across said projector, a source of electrical power, an operating circuit for said motor to said source of power, interrupting means for said circuit selectively settable at will to a plurality of moved positions corresponding respectively to the frames to be displayed in a display position before the projector, a frame selector actuated by the motor and having means for operating said interrupting means as the selected frame moves into said display position, a push button start switch having a pair of normally disengaged contacts included in said operating circuit and adapted to start the motor as the contacts are closed, and means including a winding on said start switch and included in said operating circuit for maintaining the switch contacts closed after the push button has been released and until the circuit is interrupted by said circuit interrupting means.

9. In a device of the character disclosed for selecting a desired frame of a microfilm for display, microfilm actuating means including a motor, a selector arm adapted to be actuated by said motor to different positions corresponding to the degree of movement of said microfilm from a prior setting, manipulative means for momentarily disconnecting the arm from said microfilm actuating means and for moving the arm to a predetermined initial setting corresponding to the first frame of the microfilm, a dial settable at will to different settings corresponding respectively to different frames to be selected, a motor operating circuit, motor control means adapted to be actuated by said dial to different positions respectively corresponding to said dial settings, said motor control means comprising a pair of normally closed circuit closing contacts included within said motor operating circuit and adapted to be disengaged by the arm as the arm moves to a position corresponding to the instant setting of said dial, and means for maintaining the dial in any setting thereof.

10. In a device of the character disclosed for selecting a desired frame of a film for display, a projector, means including a motor for causing the film to move through said projector, a selector arm operatively connected to said motor and adapted to be moved thereby rotatively through an angle corresponding to the length of film moved through the projector, motor control means, means settable at will for moving the motor control means to a setting corresponding to a particular frame on said film to be selected, and means on said arm adapted to co-act with said motor control means and bring the motor to rest with the selected frame of the film in a display position with respect to said projector as the selector arm moves to a position corresponding to the instant setting of said motor control means.

11. In a device of the character disclosed for selecting a desired frame of a film for display, a projector, film driving means including a reversible motor for causing the film to move in either direction in display relation to said projector, a selector arm operatively connected to said motor and adapted to be moved thereby rotatively in either direction through an angle corresponding to the length of film moved past the projector, motor control and reversing means, a frame selecting device rotatable at will in either direction from a predetermined setting to a desired setting, means on said frame selecting device for moving the motor control and reversing means to a setting corresponding to a particular frame on the film to be selected, and means on said arm adapted to co-act with said motor control and reversing means and control the direction of rotation of said motor selectively in accordance with the direction of movement of the frame selecting device from said predetermined setting.

12. In a selecting apparatus for a microfilm having a plurality of records thereon, in combination, a projector, actuating means including a motor for moving the film selectively in either direction past a display position within said projector, a selector arm operatively and releasibly connected to said film actuating means and rotatable concurrently therewith, manipulative means for momentarily disconnecting the selector arm from said film actuating means, said manipulating means being adapted to move the selector arm to a predetermined initial position while the arm is disconnected from said film actuating means, a control dial settable to different settings respectively corresponding to said records, a motor control device adapted to be moved by said dial to different settings corresponding respectively to the settings of the dial, and means on said selector arm adapted to engage said motor control device when the arm has moved from said initial position into predetermined spaced relation with respect thereto and thereby stop the motor with a selected record in said display position.

13. In a record selecting device of the character disclosed, the combination of a pair of members independently rotatable in either direction about a common axis from an initial common setting thereof, means settable at will for moving one of the members from said initial setting to a predetermined moved setting corresponding to a record to be selected, a plurality of switches carried by said one of the members, means arranged on the other of said members for maintaining the switches open when both members are set in a common setting and adapted to close the switches selectively in accordance with the direction of movement of the first member away from a common setting, a reversible motor, operative driving connections between the motor and said other of the members, a circuit including said switches and adapted to operate the motor in a direction controlled by the closed one of said switches whereby the other member is caused to follow the movement of the first member from the initial setting to said moved setting as the motor operates, means actuated by the motor for moving the records in successive order past a display position as the motor operates, and record metering means adapted to be operated by the motor in accordance with the amount of follow-up movement required to move said other of the members into said moved setting for bringing the selected record into said display position.

14. In a record selecting device of the character disclosed, the combination of a pair of members independently rotatable in either direction about a common axis from an initial common setting thereof, means settable at will for moving one of the members from said initial setting to a predetermined moved setting corresponding to a record to be selected, a pair of switches carried by said one of the members, a first means arranged on the other of said members for maintaining said pair of switches open when both members are set in a common setting and adapted to close the switches selectively in accordance with the direction of movement of the first member away from a common setting, a reversible motor, operative driving connections between the motor and said other of the members, first and second circuits each including said pair of switches and adapted to operate the motor at high and low speeds respectively in a direction controlled by the closed one of said pair of switches whereby the other member is caused to follow the movement of the first member from the initial setting to said moved setting as the motor operates, switch means carried by said one of the members for transferring control of the motor between said first and second circuits as the switch means operates, a second means arranged on the other of said members for operating said switch means as the members move into predetermined angular spaced relation with respect to each other, means actuated by the motor for moving the records in successive order past a display position as the motor operates, record metering means, and operative driving connections between said metering means and the motor for operating the metering means thereby as the motor operates in accordance with the amount of follow-up movement required to move said other of the members into said moved setting thereby to bring the selected record into said display position.

15. In a record selecting device of the character disclosed, the combination of a pair of members independently rotatable in either direction about a common axis from an initial common setting thereof, means settable at will for moving one of the members from said initial setting to a predetermined moved setting corresponding to a record to be selected, a pair of switches carried by said one of the members, a first means arranged on the other of said members for maintaining said pair of switches open when both members are set in a common setting and adapted to close the switches selectively in accordance with the direction of movement of the first member away from a common setting, a reversible motor, operative driving connections between the motor and said other of the members, a circuit including said pair of switches and adapted to operate the motor in a direction controlled by the closed one of said pair of switches whereby the other member is caused to follow the movement of the first member from the initial setting to said moved setting as the motor operates, a resistance element in said circuit for causing the motor to operate at a low speed, normally closed switch means carried by said one of the members and shunted across said element whereby the motor is caused to operate at a high speed when the switch means is closed, a second means arranged on the other of said members for opening said normally closed switch means when the other member has moved into predetermined angular spaced relation with respect to said one of the members prior to the interruption of said circuit as the closed one of said switches opens, means actuated by the motor for moving the records in successive order past a display position as the motor operates, and record metering means operatively connected to the motor and adapted to be operated thereby as the motor operates in accordance with the amount of follow-up movement required to move said other of the members into said moved setting for bringing the selected record into said display position.

ROBERT C. DUNCAN.
RAYMOND M. HICKS.

REFERENCES CITED

The following references are of record in the file of this patent:

UNITED STATES PATENTS

| Number | Name | Date |
| --- | --- | --- |
| 1,183,155 | Wood | May 16, 1916 |
| 1,889,575 | Sebille | Nov. 29, 1932 |
| 2,076,853 | McClure | Apr. 13, 1937 |
| 2,125,582 | Pratt et al. | Aug. 2, 1938 |
| 2,177,638 | Draeger | Oct. 31, 1939 |
| 2,180,638 | McMahon et al. | Nov. 21, 1939 |
| 2,323,372 | Bryce | July 6, 1943 |